Fig. I.

3,598,881
PROCESS FOR REMOVING ACID GASES FROM CRACKED GASES CONTAINING DIOLEFINS
Ludwig Kniel, Scarsdale, N.Y., and Benjamin J. Luberoff, Summit, N.J., assignors to The Lummus Company, Bloomfield, N.J.
Filed Oct. 17, 1968, Ser. No. 768,303
Int. Cl. C07c 3/00, 7/00
U.S. Cl. 260—683
17 Claims

ABSTRACT OF THE DISCLOSURE

Process for removing dienes which are carried into an aqueous amine absorption solution employed for removing acid gases from a gaseous hydrocarbon wherein the rich aqueous amine solution is intimately mixed with a hydrocarbon solvent, prior to introducing the rich amine solution into the amine regenerator, to remove the dienes therefrom. The mixture is separated into a hydrocarbon phase, containing essentially all of the dienes and an aqueous amine phase, and the aqueous amine phase passed to the amine regenerator. In this manner, polymerization problems caused by the presence of dienes in the amine absorption system are essentially eliminated.

---

Figure 1:
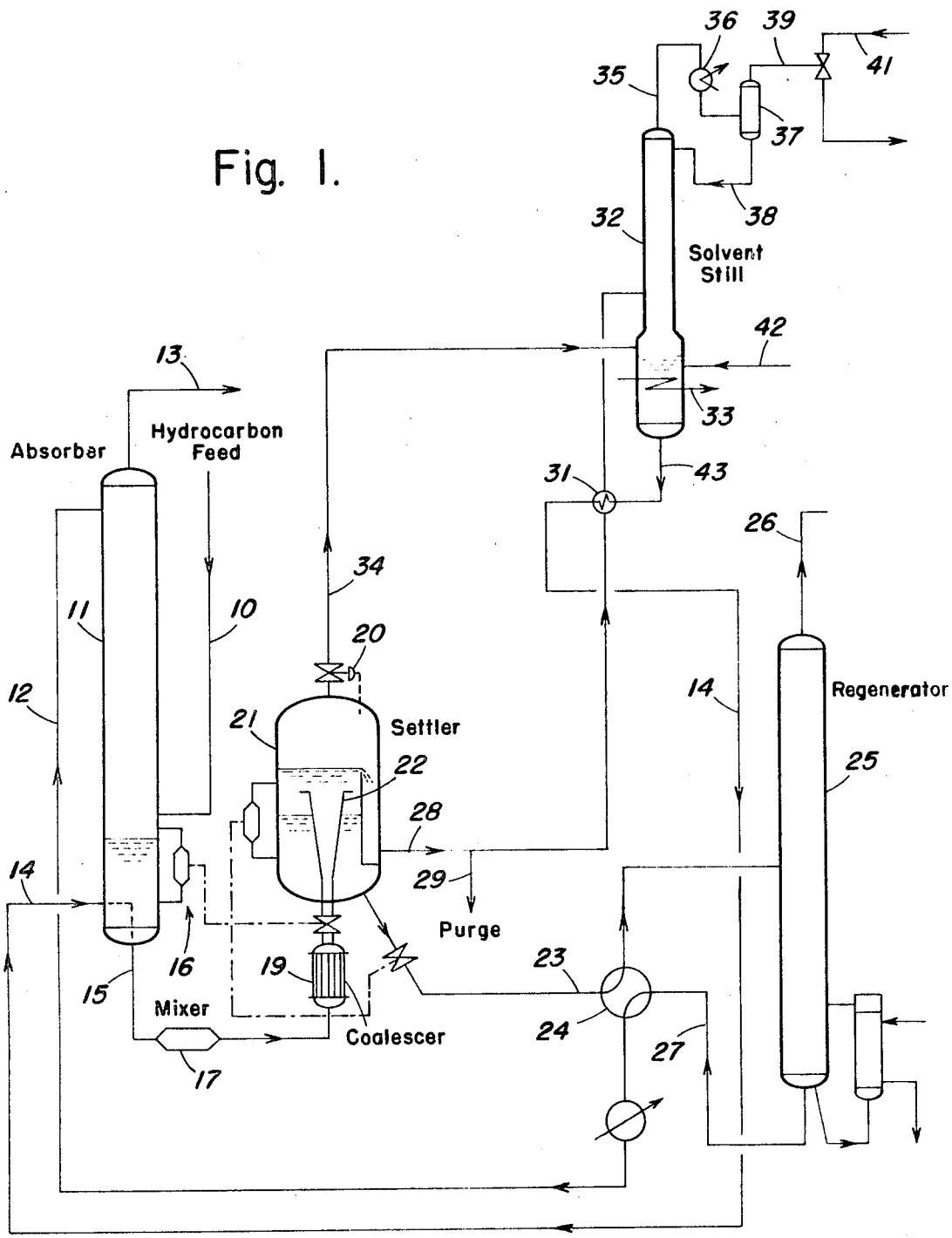

This invention relates to the treatment of aqueous amine solutions and more particularly to removing dienes from aqueous amine solutions. Still more particularly, the invention relates to an improved process for removing acid gases from a hydrocarbon effluent containing dienes.

In the pyrolysis of ethane, propane, naphtha, gas oil and other suitable feed stocks for the production of olefins, the effluent gas contains acid gases, such as carbon dioxide, hydrogen sulfide and traces of carbonyl sulfide, in addition to diolefinic compounds such as propadiene, butadiene, cyclopentadiene and the like. In the purification of such pyrolysis effluent gases for the eventual recovery of desired products, such as, ethylene, propylene and the like, the acid gases are generally first removed from the gaseous effluent by contacting the effluent in an absorption tower with a suitable solvent, such as an aqueous amine solution. The aqueous amine solution, now containing acid gases, is withdrawn from the absorption tower and introduced into a regenerator wherein the aqueous solution is heated to drive off the acid gases. The aqueous amine solution, essentially free of acid gases, is then recycled to the absorption tower.

It has now been found that serious polymerization problems are encountered in the amine regenerator and heat exchange system which are caused by the heat sensitive dienes present in the pyrolysis effluent gas being carried into the amine absorption system. The dienes, although well below their respective dew points in the pyrolysis effluent gas, are believed to be carried into the amine absorption system by one or all of the following mechanisms:

(1) The pyrolysis effluent gas prior to being introduced into the amine absorption solution is generally passed through a cooling stage wherein the heaviest hydrocarbons are partially condensed. As a result, the pyrolysis effluent gas carries a fine mist of liquid particles of dew point composition that are in phase equilibrium with the noncondensed phase and consequently contain equilibrium amounts of dienes. The liquid particles, containing the dienes, are withdrawn from the absorption tower with the aqueous amine solution.

(2) The contacting of the gaseous pyrolysis effluent in the absorption tower with the aqueous amine solution condenses some heavier hydrocarbons which are saturated with dienes.

(3) The dienes are slightly soluble in aqueous amine solution; i.e., in the order of 0.05–0.3 weight percent.

Accordingly, an object of this invention is to provide a process for removing dienes from aqueous amine solutions.

Another object of this invention is to provide an improved process for separating acid gases from a gaseous hydrocarbon containing dienes and acid gases.

A further object of this invention is to provide an amine absorption system for removing acid gases from a hydrocarbon effluent, containing acid gases and dienes, which avoids polymerization difficulties in the system.

Yet another object of this invention is to provide an improved process for removing acid gases from an effluent from a hydrocarbon pyrolysis process, particularly a pyrolysis process for producing ethylene.

Figure 2:
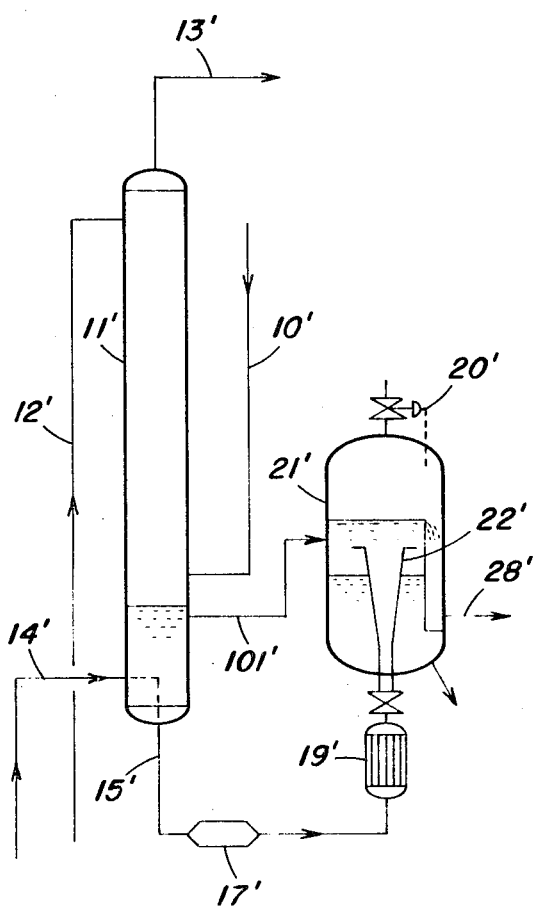

These and other objects of the invention should be readily apparent from the following detailed description thereof when read with reference to the accompanying drawings, wherein:

FIG. 1 is a simplified schematic flow diagram of one embodiment of the invention; and FIG. 2 is a simplified schematic flow diagram of another embodiment of the invention.

The objects of this invention are broadly accompanied by intimately mixing an aqueous amine solution, containing dienes, with a hydrocarbon, separating the mixture into a hydrocarbon phase and an aqueous phase, the hydrocarbon phase containing essentially all of the diene and separating the hydrocarbon phase from the aqueous amine phase whereby an aqueous amine solution essentially free of dienes is recovered.

The process of the invention is particularly applicable to an aqueous amine absorption system which is employed to remove acid gases from a gaseous hydrocarbon, containing acid gases and dienes. As hereinabove mentioned, the dienes are carried into the amine absorption solution and cause polymerization problems in the amine regenerator and heat exchange system. In accordance with the invention, the bottoms from the amine absorber are intimately mixed with a hydrocarbon and a hydrocarbon phase, containing the dienes, is separated from the aqueous amine solution prior to introducing the aqueous amine solution into the amine regenerator and heat exchange system. Thus, in the pyrolysis of a hydrocarbon such as ethane, propane, naphtha, gas oil or the like to produce ethylene, the gaseous effluent, containing dienes, is contacted with the aqueous amine solution in an absorption tower to remove acid gases and as a result of such contact, heavier hydrocarbons, including dienes, are carried into the aqueous amine solution. The amount of hydrocarbon carried into the aqueous amine solution is dependent upon the pyrolysis feed (with ethane or propane as feed, the pyrolysis effluent contains little heavier hydrocarbons and with naphtha and gas oil as pyrolysis feed, larger amount of heavier material are present) and in cases where the amount of hydrocarbon carried into the amine solution exceeds the amount which can be dissolved such excess may be present as a coagulated oil phase and a dispersion of hydrocarbons in an aqueous solution. When such excess is present, the excess is preferably separated from the aqueous amine solution, prior to mixing the amine solution with the hydrocarbon, as hereinafter described with reference to the embodiment of FIG. 2.

The hydrocarbon solvent employed for removing the dienes from the aqueous amine solution is one that is essentially free of olefinically unsaturated components and has a boiling point of at least 100° C. to prevent vaporization at the temperatures and pressures employed in the amine absorption system; i.e., the amine absorber is generally operated at a temperature between about 75° F. and about 125° F., and a pressure of between about 50 and about 400 p.s.i.g. and, therefore, the settler for separating the hydrocarbon and aqueous phases, as hereinafter described, is generally operated at a temperature between about 65° F. and about 120° F. and a pressure between about 25 and about 300 p.s.i.g. In addition, in order to facilitate recycle of the hydrocarbon solvent, the solvent should not for mazeotropes with the dienes generally present in the pyrolysis effluent thereby enabling solvent recovery by a simple distillation. The hydrocarbon solvent may contain one or more components and may be either aromatic or non-aromatic, with an aromatic solvent, such as, toluene, being preferred, although effective results are also obtained with a non-aromatic hydrocarbon, such as, a low molecular weight naphtha.

The hydrocarbon solvent is mixed with the rich aqueous amine in an amount sufficient to separate all of the diolefins dispersed or dissolved therein. In general, the addition of between about 0.5 and about 2.0 percent, by weight, of hydrocarbon solvent, based on the amine circulation, should be sufficient to effectively remove the dienes although higher amounts may be employed in some cases, e.g., up to about 4%. The hydrocarbon and aqueous amine are intimately contacted with each other for a time sufficient to effect equilibration; i.e., effective absorption of essentially all dienes into the hydrocarbon solvent.

The invention will now be described in more detail with reference to the embodiments thereof illustrated in FIGS. 1 and 2 of the drawings. It is to be understood that although the embodiments are described with reference to the treatment of a pyrolysis effluent, such embodiments are equally applicable to the treatment of gaseous hydrocarbons obtained from other sources. It is further to be understood that various equipments, such as pumps and the like, are not shown in the drawings to facilitate the description thereof and the placing of such equipment at appropriate places is deemed to be within the scope of those skilled in the art.

Referring now to FIG. 1, which illustrates an embodiment which is particularly applicable to the treatment of an amine absorption solution where the amount of heavier hydrocarbons carried into the aqueous amine solution is relatively small, a gaseous hydrocarbon in line 10 such as an effluent obtained from the pyrolysis of ethane, containing acid gases and dienes as impurities, is introduced into an absorption tower 11, containing suitable gas-liquid contacting devices, to effect removal of acid gases. An aqueous amine solution, such as an aqueous solution of monoethanolamine, is introduced into absorption tower 11 through line 12 and countercurrently contacts the hydrocarbon gas. As a result of such contact, acid gases are absorbed by the aqueous amine solution and in addition, dienes contained in the gaseous hydrocarbon effluent are carried into the aqueous amine solution. An acid gas free hydrocarbon is withdrawn from absorption tower 11 through line 13.

A hydrocarbon having the properties hereinabove described, such as, toluene or a debutanized aromatic distillate essentially free of dienes, is added to the aqueous amine solution bottoms of absorption tower 11 through line 14 and a combined stream withdrawn through line 15. A suitable low liquid level is maintained in the bottom of absorption tower 11 by a level control device generally indicated as 16. The combined hydrocarbon-aqueous amine stream in line 15 is passed through a mixing device 17, of a type known in the art, to insure intimate contact between the aqueous amine and the hydrocarbon, and then through a coalescer 19 to enhance separation of hydrocarbon and aqueous phases. The mixture withdrawn from coalescer 19 is introduced into a vertical settler 21 through a truncated cone inlet 22 which is maintained at a pressure lower than the pressure maintained in absorber 11 by a pressure control valve 20. By releasing the pressure on the mixture, gases, such as, methane, which have been dissolved in the amine solution in the absorber 11 are released from the solution and the lifting action of these released gases in conjunction with the vertical positioning of the settler 21 and the truncated cone inlet 22 enhances the separation of the two phases in settler 21 by bringing the dispersed hydrocarbon phase to the surface.

An aqueous amine solution, essentially free of hydrocarbons is withdrawn from settler 21 through line 23, passed through heat exchanger 24 to effect heating thereof by indirect heat transfer with regenerated amine solution and introduced into amine regenerator 25. An acid gas overhead is withdrawn from amine regenerator 25 through line 26. A regenerated amine solution bottoms is withdrawn from regenerator 25 through line 27, passed through heat exchanger 24 to effect cooling thereof and recycled to the amine absorber 11 through line 12.

The hydrocarbon phase which forms in settler 21, containing essentially all of the hydrocarbons which are withdrawn from absorption tower 11 through line 15, is skimmed off and withdrawn from settler 21 through line 28. A portion of the hydrocarbon in line 28 is purged through line 29, to prevent a buildup of any dienes present which cannot be separated by a simple distillation and the remaining portion is passed through heat exchanger 31 and introduced into a low pressure distillation tower 32, operated, for example, at a pressure of 2.5 p.s.i.a. and a maximum base temperature of about 140° F.; e.g., by a reboiler coil 33 supplied with hot water at 150° F., to prevent polymerization of dienes.

The gases released in the settler 21 are withdrawn therefrom through line 34 and introduced into the distillation tower 32 to both recover any hydrocarbon solvent contained therein and aid in the stripping of dienes. A diene overhead is withdrawn from distillation tower 32 through line 35, passed through condenser 36, supplied with a suitable refrigerant; e.g., a 40° F. refrigerant, to condense a portion thereof and introduced into a reflux drum 37. The liquid portion separated in reflux drum 37 is recycled as reflux to the the tower 32 through line 38. The gaseous portion is withdrawn from reflux drum 37 through line 39 by a steam ejector 41, or a vacuum pump, which maintains the operating pressure in the tower 32.

A hydrocarbon solvent bottoms, essentially free of dienes and including any make-up solvent introduced through line 42, is withdrawn from tower 32 through line 43, passed through heat exchanger 31 to indirectly heat the feed to the tower 32, and introduced into the absorption tower 11 through line 14.

Referring now to FIG. 2, which illustrates an embodiment which is particularly applicable to the treatment of an amine solution where the amount of heavier hydrocarbon carried into the aqueous amine solution is relatively large and wherein parts identical to parts of the embodiment of FIG. 1 are represented by like prime numerals, a gaseous hydrocarbon in line 10' such as an effluent obtained from the pyrolysis of naphtha, containing acid gases and dienes as impurities, is introduced into an absorption tower 11', containing suitable contacting devices, to effect removal of acid gases. An aqueous amine solution, such as an aqueous solution of monoethanolamine, is introduced into absorption tower 11' through line 12' and countercurrently contacts the hydrocarbon gas. As a result of such contact, acid gases are absorbed by the aqueous amine solution and in addition dienes and heavier hydrocarbons contained in the gaseous hydrocarbon effluent are carried into the aqueous amine solution. An acid gas free hydrocarbon is withdrawn from absorption tower 11' through line 13'.

As a result of the presence of relatively large amounts of heavier hydrocarbons in the gaseous effluent introduced into absorption tower 11', relatively large amounts of heavier hydrocarbons are carried into the amine solution. In accordance with this embodiment, the liquid level controller 16' is employed to maintain a higher liquid level in the bottom of absorption tower 11' and a primary separation of a hydrocarbon phase is effected in the bottom of the absorption tower 11'. The primary hydrocarbon phase is withdrawn from the absorption tower 11' through line 101 and introduced, without further treatment, into the upper portion of settling tank 21'. Alternatively, a separate vessel may be installed next to the absorber 11' in fluid flow communication therewith and the initial phase separation effected in the separate vessel.

A hydrocarbon having the properties hereinabove described, such as, naphtha, is added to the aqueous amine solution bottoms of absorption tower 11' remaining after the initial hydrocarbon phase separation, through line 14' and a combined stream withdrawn through line 15'. The combined hydrocarbon-aqueous amine stream in line 15' is passed through a mixing device 17' of a type known in the art to insure intimate contact between the aqueous amine and hydrocarbon, through a coalescing element 19' to enhance separation of aqueous and hydrocarbon phases and into settler 21'. A hydrocarbon phase and an aqueous phase are withdrawn from settler 21' and further treated as hereinafter described with reference to FIG. 1.

It should be readily apparent from the above description that the embodiments of FIGS. 1 and 2 are similar except that in accordance with the embodiment of FIG. 2, a two-stage hydrocarbon treatment and separation is effected.

The hereinabove described invention may be modified in numerous ways within the spirit and scope thereof. Thus, for example, the hydrocarbon and aqueous amine phases may be separated by a technique other than settling and decantation. As another modification, the aqueous amine solution may be treated with a hydrocarbon having the hereinabove described properties in more than one stage, although in most cases, a one-stage treatment is sufficient. As a further modification, the hydrocarbon may be added to the rich amine solution at a place other than the bottom of the absorption tower so long as such addition is effected prior to the amine regeneration.

As still another modification, if the hydrocarbon employed for removing dienes from the aqueous amine acid gas absorption solution is obtained from a petrochemical operation, for example, an aromatic distillate, the distillation column for treating the hydrocarbon phase from the settler may be eliminated and the hydrocarbon phase, after removing any water present, directly recycled to the petrochemical operation.

The above modifications and numerous other modifications should be apparent to those skilled in the art from the detailed description of the invention.

The invention is further illustrated by the following example, but the scope of the invention is not to be limited thereby.

EXAMPLE

The following is illustrative of operating conditions for the embodiment of FIG. 1:

Absorber 11: 90° F.
  Pressure: 220 p.s.i.g.
  Temp.: 90° F.
Settler 21:
  Pressure: 40 p.s.i.g.
  Temp.: 90° F.
Amine Regenerator 25:
  Pressure: 10 p.s.i.g.
  Temp.: 250° F.
Distillation Tower 32:
  Pressure: 2.0 p.s.i.a.
  Overhead Temp.: 35° F.
  Bottoms Temp.: 130° F.

The aqueous amine soluion is aqueous monoethanolamine, the feed to the amine absorber is an effluent obtained by pyrolyzing ethane, containing acid gases and hydrocarbon dienes and the hydrocarbon solvent is toluene, employed in an amount which is 2.0 percent, by weight, of the aqueous amine circulation. The aqueous amine solution which is introduced into the amine regenerator contains less than 20 p.p.m. of dienes.

The process of the invention may be employed for removing dienes from a wide variety of amine solutions which are generally employed for separating acid gases from gaseous mixtures. As representative examples of such amines, including primary, secondary and tertiary and mono- di- and triamines, there may be mentioned: aliphatic hydrocarbon amines; such as, hexylamine, dipropylamine, propylene diamine, trimethylenediamine, ethylene diamine, triaminopropane, and the like; hydroxy- substituted aliphatic hydrocarbon amines; such as, mono-, di-, and triethanolamine, dihydroxypropylamine, diethylaminoethyl alcohol, and the like; aralkylamines; such as, benzylamine, phenylethylamine, and the like; cycloaliphatic hydrocarbon amines; such as, cyclohexylamine, cyclopentylamine, and the like; etc. These aqueous amine solutions are generally known in the art and the above examples are not to be considered as limiting the scope of the invention.

The dienes which are generally separated from the aqueous amine solution are those that are produced during a hydrocarbon pyrolysis process; such as, alkadienes; e.g., butadiene, propaicdiene, pentadiene, etc., and cycloalkadienes; e.g., cyclopentadiene, cyclohexadiene, etc. In the pyrolysis of a hydrocarbon to produce ethylene, the dienes most generally present in the effluent are butadiene, cyclopentadiene and cyclohexadiene. It is to be understood that the above representative examples are not to be considered as limiting the scope of the invention.

The process of the invention is effective for separating dienes from aqueous amine solutions and is particularly applicable to improving an acid gas removal system employing aqueous amine absorption solutions. The process of the invention is advantageous in that polymerization problems heretofore encountered in the amine regenerator and heat exchange systems are essentially eliminated. In addition, the steps employed for eliminating such problems are easily integrated into existing amine absorption systems. Furthermore, the process is economical in that essentially complete recovery of all components is effected. The above advantages and numerous other advantages of the invention should be readily apparent from the above description thereof.

Numerous modifications and variations of the invention are possible in light of the above teachings and, therefore, within the scope of the appended claims, the invention may be practiced otherwise than as particularly described.

What is claimed is:

1. In the removal of acid gases from a gaseous hydrocarbon containing dienes and acid gases wherein the gaseous effluent is contacted in an absorption zone with an aqueous amine acid gas absorption solution to effect removal of said acid gases and dienes are also carried from the gaseous effluent into the aqueous amine solution, the improvement comprising: mixing the aqueous amine solution, containing acid gases and dienes, with a hydrocarbon solvent essentially free of olefinically unsaturated components to effect intimate contact between the hydrocarbon and the aqueous amine, separating the mixture into a hydrocarbon phase containing essentially all of the dienes and an aqueous amine phase and separating the hydrocarbon phase from the aqueous amine phase whereby an aqueous amine solution essentially free of dienes is recovered.

2. The process as defined in claim 1 and further comprising: introducing the aqueous amine solution essentially free of dienes into a regeneration zone wherein the acid gases are removed from the aqueous amine solution and recycling the aqueous amine solution to the absorption zone.

3. The process as defined in claim 1 wherein heavier hydrocarbons in addition to the dienes are condensed from the gaseous effluent into the aqueous amine solution and further comprising: separating an initial hydrocarbon phase from the aqueous amine solution prior to mixing the aqueous amine solution with the hydrocarbon and adding the initial hydrocarbon phase to the mixture of liquid hydrocarbon and aqueous amine solution prior to forming the hydrocarbon and aqueous amine phase.

4. The process as defined in claim 1 wherein the hydrocarbon solvent is toluene.

5. The process as defined in claim 1 wherein the hydrocarbon solvent is naphtha.

6. The process as defined in claim 1 wherein the hydrocarbon solvent has a boiling point of at least about 100° C.

7. The process as defined in claim 1 and further comprising: distilling the separated hydrocarbon phase to remove absorbed dienes and employing the diene free hydrocarbon phase as at least a portion of the hydrocarbon solvent.

8. In the pyrolysis of a hydrocarbon to produce a gaseous hydrocarbon effluent which includes dienes and acid gases wherein the effluent is contacted in an absorption zone with an aqueous amine acid gas absorption solution to effect removal of said acid gases and dienes are also carried from the gaseous effluent into the aqueous amine solution, and the acid gas rich aqueous amine solution is introduced into a regeneration zone to effect removal of the acid gases, and the aqueous amine solution from the regeneration zone is recycled to the absorption zone, the improved process comprising: mixing the aqueous amine solution from the absorption zone with a hydrocarbon solvent essentially free of olefinically unsaturated components and having a boiling point of at least 100° C. prior to introducing the aqueous amine solution into the regeneration zone to effect intimate contact between the hydrocarbon solvent and the aqueous amine solution, introducing the mixture into a settling zone wherein the mixture is separated into an aqueous amine phase and a hydrocarbon phase, containing essentially all of the dienes carried into the aqueous amine solution and introducing the aqueous amine phase, essentially free of dienes, into the regeneration zone to effect removal of the dissolved acid gases.

9. The process as defined in claim 8 wherein the hydrocarbon solvent is employed in an amount between about 0.5 and about 2.0 percent, by weight, based on the aqueous amine solution.

10. The process as defined in claim 9 wherein the absorption zone is operated at a temperature between about 75° F. and about 125° F. and a pressure between about 50 and about 400 p.s.i.g. and the settling zone is operated at a temperature between about 65° F. and about 120° F. and a pressure between about 25 and about 300 p.s.i.g., the pressure in the settling zone being lower than the pressure in the absorption zone.

11. The process as defined in claim 10 and further comprising: introducing the hydrocarbon phase from the settling zone into a distillation zone operated at a maximum base temperature of about 140° F. to strip dienes therefrom and employing the hydrocarbon phase from the distillation zone as at least a portion of the hydrocarbon solvent mixed with the aqueous amine solution.

12. The process as defined in claim 11 wherein the hydrocarbon solvent is toluene.

13. The process as defined in claim 12 wherein the settling zone is vertically disposed to enhance separation of the mixture into an upper hydrocarbon phase and a lower aqueous amine phase.

14. The process as defined in claim 13 wherein the diene is selected from the group consisting of butadiene, cyclopentadiene, cyclohexadiene and mixtures thereof.

15. The process as defined in claim 14 wherein the amine solution is a solution of monoethanolamine.

16. The process as defined in claim 1 wherein the aqueous amine absorption solution contains an amine selected from the group consisting of aliphatic hydrocarbon amines, hydroxy-substituted aliphatic hydrocarbon amines, aralkyl amines and cycloaliphatic hydrocarbon amines.

17. The process as defined in claim 8 wherein the aqueous amine absorption solution contains an amine selected from the group consisting of aliphatic hydrocarbon amines, hydroxy-substituted aliphatic hydrocarbon amines, aralkyl amines and cycloaliphatic hydrocarbon amines.

References Cited

UNITED STATES PATENTS

| | | | |
|---|---|---|---|
| 3,233,004 | 2/1966 | Hirschbeck et al. | 260—677 |
| 2,527,951 | 10/1950 | Mayland et al. | 260—677 |
| 3,390,075 | 6/1968 | Harper | 208—341 |
| 3,228,874 | 1/1966 | Morgan | 208—236 |
| 2,487,577 | 11/1949 | Stanley | 23—3 |
| 1,986,228 | 1/1935 | Seguy | 208—236 |
| 2,301,588 | 11/1942 | Schulze et al. | 208—236 |
| 3,098,705 | 7/1963 | Bally | 23—3 |
| 2,970,177 | 1/1961 | Cobb | 260—677 |
| 3,284,339 | 11/1966 | Begley et al. | 208—87 |

FOREIGN PATENTS

| | | | |
|---|---|---|---|
| 466,729 | 7/1950 | Canada | 260—681.5 |

DELBERT E. GANTZ, Primary Examiner

J. M. NELSON, Assistant Examiner

U.S. Cl. X.R.

260—677A, 681.5